July 23, 1929.  F. J. MUNDY ET AL  1,722,106
MOTOR LORRY AND OTHER ROAD OR RAIL VEHICLE FOR CONVEYING GOODS
Filed July 16, 1928
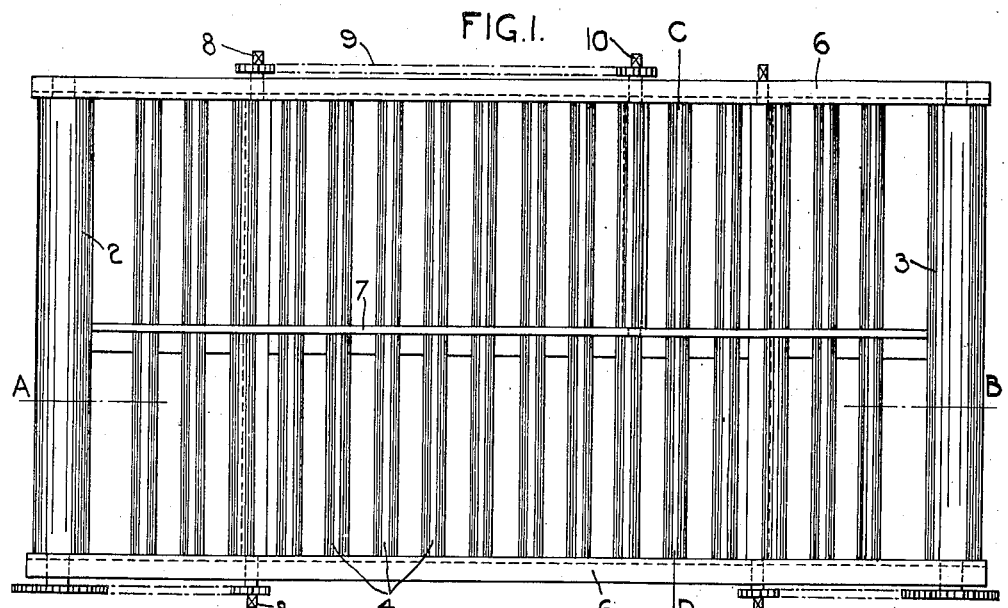
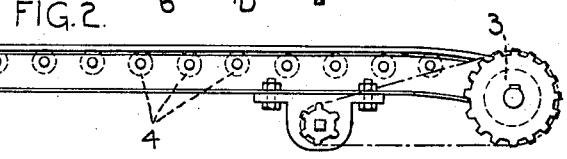
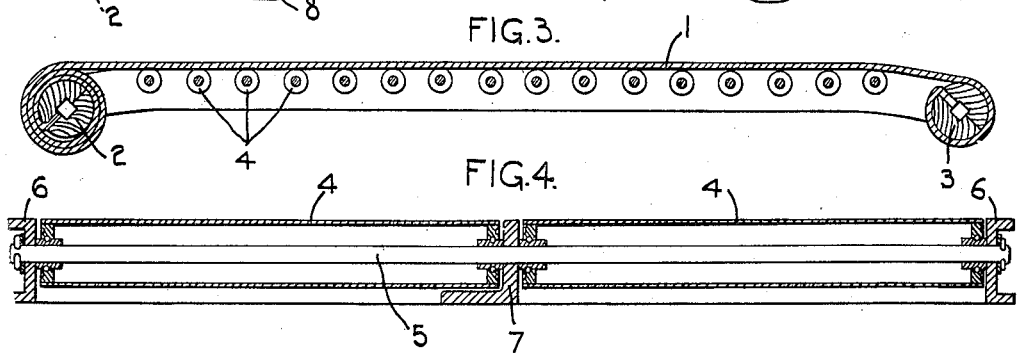
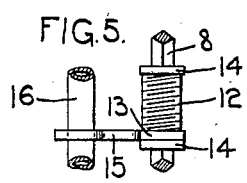
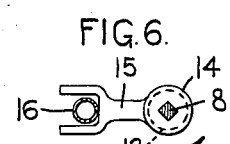
Inventors
Frederick J. Mundy
and Charles Solomon,
by Herbert W. Jenner,
Attorney.

Patented July 23, 1929.

1,722,106

UNITED STATES PATENT OFFICE.

FREDERICK JOHN MUNDY, OF PENARTH, WALES, AND CHARLES SOLOMON, OF BATH, ENGLAND.

MOTOR LORRY AND OTHER ROAD OR RAIL VEHICLE FOR CONVEYING GOODS.

Application filed July 16, 1928, Serial No. 292,972, and in Great Britain April 5, 1928.

This invention relates to motor lorries and other road or rail vehicles. To facilitate the unloading and loading of motor lorries and other vehicles it is known to provide the same with a movable floor.

The advantages arising from the provision of a movable floor to a motor lorry or like vehicle are numerous and too apparent to need reciting and as vehicles so fitted are not in general use it can only be assumed that the constructions of such a movable floor heretofore proposed have not been found satisfactory in practice.

A movable floor constituted by an endless travelling belt has been already proposed, the said belt passing over end rollers and intermediate rollers extending across the vehicle being provided to take or distribute the weight of the belt.

The object of the present invention is to provide an improved construction of movable floor that is extremely easy to manipulate and highly efficient and expeditious in operation, and according to the invention the movable floor is constituted by a band of flexible material fixed at its ends on rotary drums or rollers located one at each end of the vehicle and the rollers that support the said band are mounted to rotate freely on rigid axles that extend right across the vehicle. Advantages of the improved construction are that there is no possibility of slip between the end drums or rollers and the band which may well happen under certain conditions in the case of endless band constructions of movable floor; moreover, the rigid axles on which the supporting rollers are freely mounted act as ties between the side members of the vehicle and thereby strengthen the construction of the same. Furthermore, according to the invention freedom of rotation of the supporting rollers is ensured by the provision of roller or ball bearings whereby the said rollers are mounted on the rigid axles; moreover, in order to avoid whip due to the pressure of the load on the supporting rollers the said rollers may each be formed in two or more lengths according to the width of the vehicle.

With advantage the movable floor according to the invention consists of a band of rubber and canvas, balata and canvas, or suitable canvas such as canvas of the kind used on coal conveyors, or similar flexible material.

The supporting rollers may conveniently consist of lengths of tube and the ball or roller bearings therefor comprise units located within the end portions of said tubes. A further advantage of making the supporting rollers in two or more lengths is that it enables the rigid axles to be supported at points intermediate of the lengths thereof as by longitudinal angle iron members the upwardly extending web of which extends between the adjacent ends of the roller sections and through which web the axles are passed. The vehicle is not provided with any bottom other than that formed by the movable floor that rests on the supporting rollers.

Fig. 1 of the accompaanying illustrative drawings is a plan showing the rollers and certain associated parts of a motor lorry floor embodying the invention, the flexible band being omitted.

Fig. 2 shows the said floor in side elevation, and

Fig. 3 is a section corresponding to the line A B of Fig. 1.

Fig. 4 is a cross section on the line C D of Fig. 1 to a larger scale.

Fig. 5 is a plan, and Fig. 6 an elevation illustrating a suitable stop arrangement to limit the movement of the belt forming the movable floor.

The movable floor consists of a band 1 of rubber and canvas, balata and canvas, or single ply canvas of the type used on coal conveyors. One end of the band is fixed on a suitably supported front roller 2 and the other end on a similarly supported rear roller 3 of the same length and diameter. Two parallel side bars 6 are provided, and are preferably channel-shaped in cross-section. These side bars are secured to the framing of the dumping vehicle, and their end portions are preferably bent a little downwardly, and have the driving shafts of the two end rollers 2 and 3 journaled in them. The band 1 must be of sufficient length to enable the load to be fully discharged due allowance being made in the case of loose materials such as roadstone, coal, sand, or the like for the preliminary falling back of the front portion of the load that necessarily ensues when the unloading operation commences. This extra length does away with the necessity of providing a wall plate mounted on the travelling band and besides rendering the operation foolproof removes the friction caused by grit and small stones and the like working between the wall plate and the vertical sides of the lorry and also enables the load to be fully discharged.

It will be understood that the band 1 extends the full width of the lorry and the full length thereof.

Any appropriate mechanism embodying necessary gearing such as a spur wheel, worm or worm wheel, epicyclic or chain gear can be provided for rotating the front and rear rollers and, in order to reduce friction, the bearings for said rollers are preferably of the ball or roller type. If the mechanism is hand-operated it may conveniently be driven by means of a detachable crank handle. If the mechanism is power-driven the necessary power may be derived from the lorry motor in which case the gear would include suitable clutch mechanism.

When applied to a lorry for conveying loose material such as coal, gravel, sand, roadstone and the like any suitable means may be provided for preventing the material getting underneath the movable floor 1 and thereby interfering with its free working. For example the sides of the lorry may be fitted with chamfered metal strips that project over the longitudinal edges of the movable floor.

In order to reduce friction the movable floor is arranged to work on steel ball bearing rollers 4 of a similar type to those used with gravity conveyors. These supporting rollers are mounted in sets of two across the full lorry width on axles 5 mounted in the side channels 6 of the lorry and in the example illustrated a centrally arranged length of supporting angle iron 7 is provided running the length of the lorry. The supporting rollers 4 are arranged in sets rather than in one complete length in order to prevent whip due to pressure of load on the rollers and it is anticipated that the smaller lorries would require two-set rollers as shown, and the larger vehicles three-set. In the case of the rollers being in sets of three two lengths of supporting angle iron 7 would be provided.

Whilst essentially adapted to facilitate the quick unloading of a vehicle it will be appreciated that goods such as packing cases and the like can be quickly and easily handled in loading the vehicle by placing the said goods on the movable floor and drawing the said floor along the length of the vehicle in stages as the loading proceeds.

The front and rear rollers can be rotated through a suitable gear actuated, it may be, from either side by means of a detachable crank handle.

A convenient gear to effect the operation of the band is the gear shown of the chain and sprocket wheel type, as such gear is relatively light and cheap. In order to enable loading and unloading to be effected from the rear end of the vehicle a shaft 8 that is operated by a detachable crank handle from one or either side of the lorry to rotate the front roller 2, is extended across to the other side of the lorry and has fixed on its far end another sprocket wheel that, through a chain 9, engages a sprocket wheel on another shorter transverse shaft 10 located near the rear end of the lorry, the said short shaft being also rotatable by means of a detachable crank handle. To limit the travel of the belt and thus prevent overwinding of either front or rear rollers 2 and 3 the gear drive shaft 8 running across the lorry may be constructed say of square steel tubing and there may be mounted thereon a sleeve 12 with a square centre hole to fit the shaft, see Figs. 5 and 6, the said sleeve being formed with an external screw thread engaged by a nut 13 that can slide between stops 14 in order to limit the movement of the nut 13 and thereby limit the travel of the band from roller to roller to the exact length required. In the example shown the stops 14 consist of rings or flanges 14 that are preferably adjustable on the sleeve 12. The nut 13 is formed with an arm 15 having a bifurcated free end that embraces and slides on a fixed rod or tube 16 so that the nut is thereby prevented from rotating.

The front and rear rollers 2 and 3 to which the ends of the band are secured are preferably formed of either wood or metal in halves between which the end of the band is gripped, see Fig. 3.

The band 1 may be of the same thickness or number of ply throughout its length, in which case, when the portion of the band which supports the load shows signs of wear, the band ends could be reversed which would bring into operative position for supporting purposes the portion of the band that up till then had only been used for traction purposes, that is to say for drawing back the band after an unloading operation. Alternatively for the sake of lightness and cheapness, the portion of the band used for traction purposes only can be made of less thickness than the other portion but in this case the band ends could not be reversed.

It will be appreciated that a lorry fitted with the improved movable floor is not provided with a supporting or under floor. It will also be appreciated that a floor constructed of articulated slate is not so suitable for use in handling loose material such as sand, gravel, coal and the like as is a band of rubber and canvas or canvas only. The supporting rollers are placed sufficiently near together as to prevent the band sagging between the rollers when loaded.

What we claim is:—

1. In a dumping vehicle, two side bars, end rollers journaled in the side bars, a flexible floor band having its end portions wound on the end rollers, means for preventing the floor band from sagging between the end rollers, a driving shaft and intermediate driving mechanism operatively connected with one of the said end rollers, a screwthreaded sleeve secured on the driving shaft and provided with stops at its ends, a nut engaging with the said sleeve, and means which prevent the nut from rotating, said stops operating to limit the movements of the nut and preventing the floor band from being overwound.

2. In a dumping vehicle, two side bars, end rollers journaled in the side bars, a flexible floor band having its end portions wound on the end rollers, stationary shafts arranged under the floor band and having their ends secured to the said side bars and preventing them from spreading apart, and rollers mounted to rotate on the stationary shafts and operating to prevent the floor band from sagging between the end rollers.

3. A dumping wagon as set forth in claim 2, and provided also with a central longitudinal bar for supporting the middle portions of the stationary shafts, and the rollers which prevent the floor band from sagging being formed in two series and arranged on each side of the central bar between it and the side bars.

In testimony whereof we affix our signatures.

FREDERICK JOHN MUNDY.
CHARLES SOLOMON.